United States Patent
Zhang

(10) Patent No.: US 8,299,376 B2
(45) Date of Patent: Oct. 30, 2012

(54) KEY BUTTON MECHANISM AND ELECTRONIC DEVICE USING THE SAME

(75) Inventor: Yu Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 445 days.

(21) Appl. No.: 12/764,192

(22) Filed: Apr. 21, 2010

(65) Prior Publication Data
US 2011/0043452 A1   Feb. 24, 2011

(30) Foreign Application Priority Data
Aug. 24, 2009   (CN) .......................... 2009 1 0305982

(51) Int. Cl.
*H01H 13/74*   (2006.01)
*H01H 13/76*   (2006.01)
*H01H 19/26*   (2006.01)

(52) U.S. Cl. .......................................... 200/5 E; 200/339
(58) Field of Classification Search ................... 200/5 E, 200/339, 16 C, 18, 553, 556, 557, 337, 335, 200/244, 529
See application file for complete search history.

(56) References Cited

U.S. PATENT DOCUMENTS

| | | | | |
|---|---|---|---|---|
| 2,808,482 | A * | 10/1957 | Zanichkowsky et al. | 200/6 A |
| 6,278,069 | B1 * | 8/2001 | Lee et al. | 200/16 C |
| 6,576,855 | B2 * | 6/2003 | Levendis et al. | 200/339 |
| 6,613,990 | B2 * | 9/2003 | Kawasaki | 200/6 A |
| 7,994,447 | B2 * | 8/2011 | Sakai | 200/529 |

* cited by examiner

*Primary Examiner* — Felix O Figueroa
(74) *Attorney, Agent, or Firm* — Altis Law Group, Inc.

(57) ABSTRACT

A key button structure for entering data in an electronic device comprises a first key element and a second key element. The second key element is retained to the first key element by a retaining mechanism. The second key element has a joint positioned at a side thereof opposite to the first key element and two actuators located at an opposite side thereof facing the first key element. The joint pivotably couples the second key element to a housing of the electronic device.

19 Claims, 2 Drawing Sheets

KEY BUTTON MECHANISM AND ELECTRONIC DEVICE USING THE SAME

BACKGROUND

1. Technical Field

This disclosure relates to key button mechanisms, particularly to key button mechanisms used in a portable electronic device.

2. Description of Related Art

Many portable electronic devices such as mobile phones, have housings with an interior compartment for receiving a printed circuit board (PCB) therein. The mobile phones usually include a side key assembly on an outer sidewall of the housing, so that user can operate the mobile phone with just one finger. However, many known side key assemblies have complicated configurations.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary housing and method making the housing. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
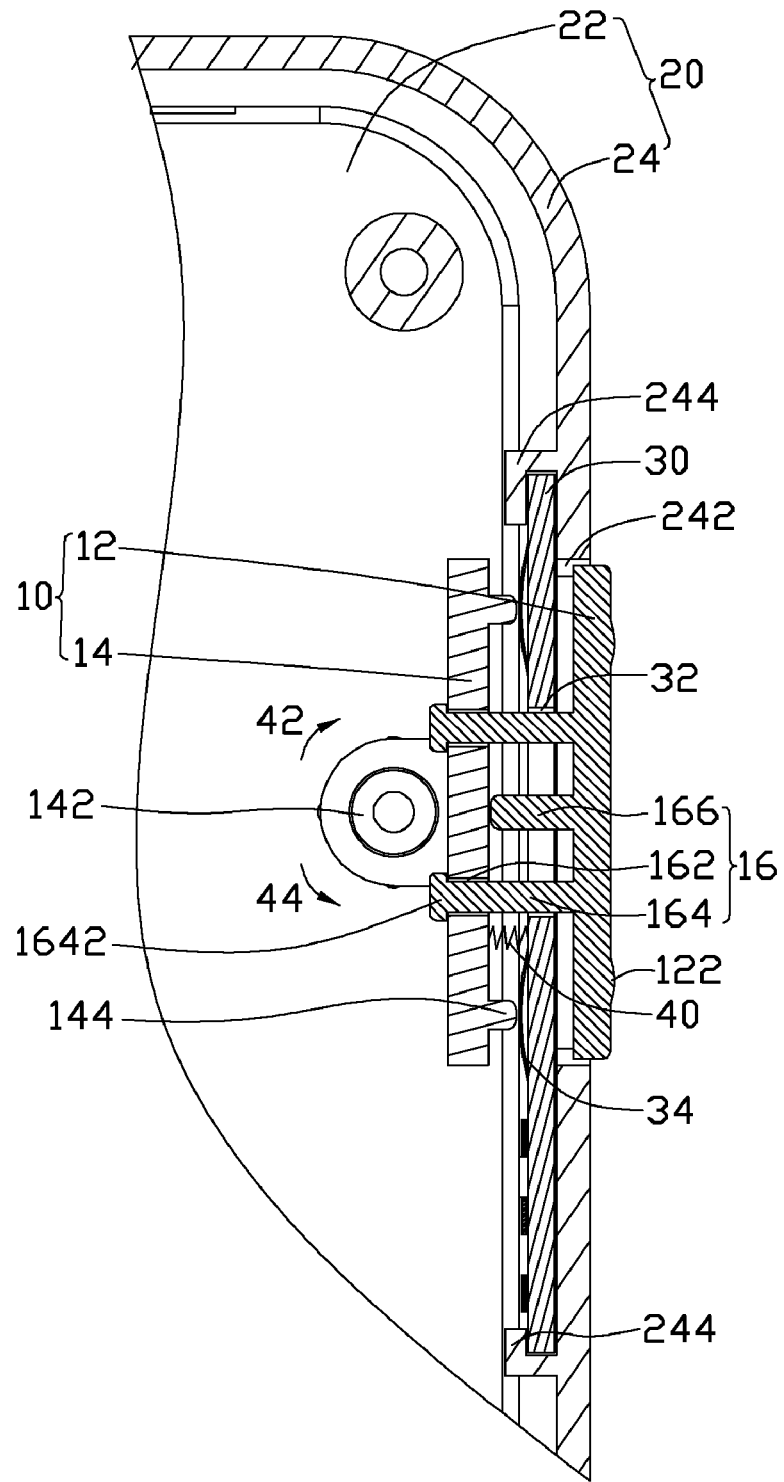
FIG. 1 is an exemplary cross sectional view of a key button mechanism in a closed configuration.
Figure 2:
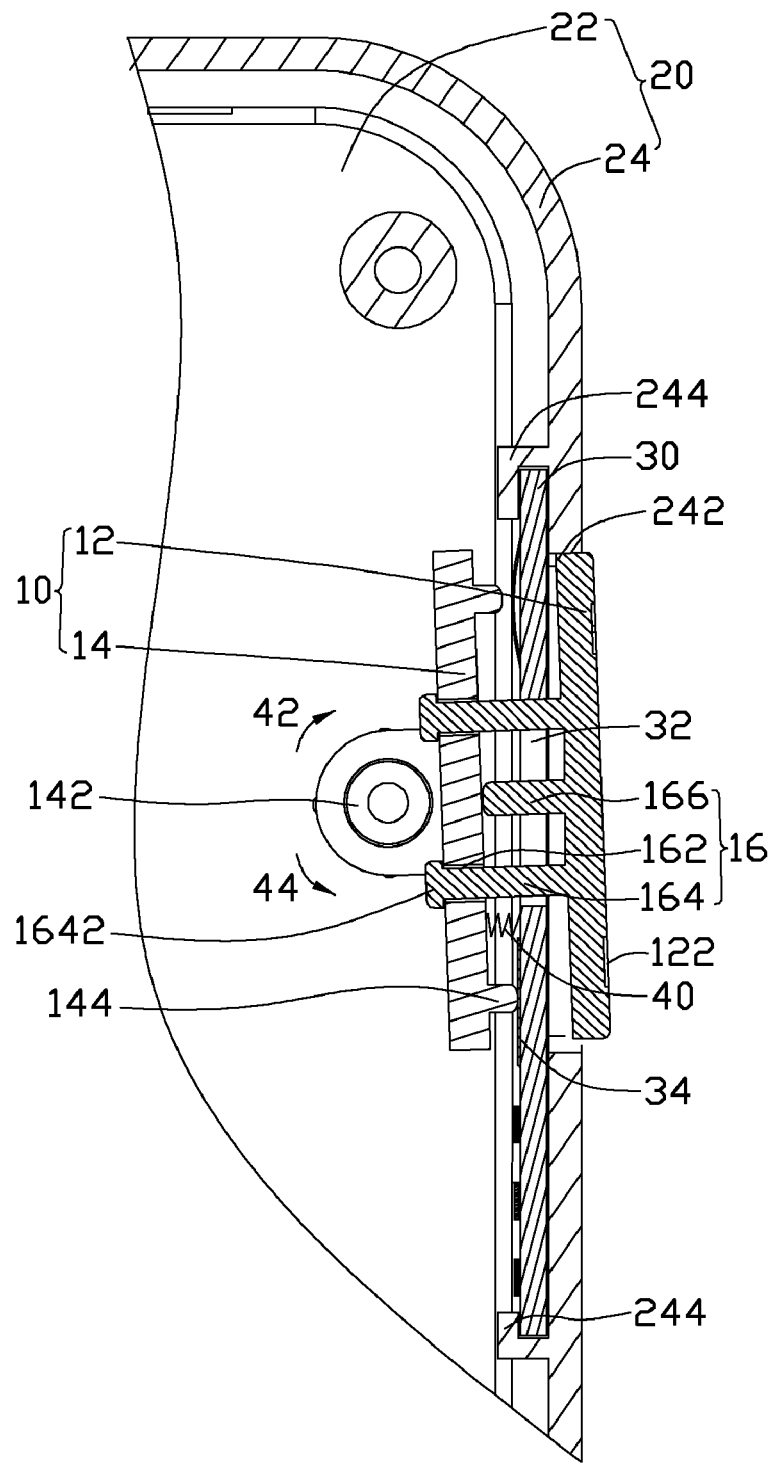
FIG. 2 is an exemplary cross sectional view of the key button mechanism in a pressed configuration.

An embodiment of an electronic device 100 incorporating a key button mechanism 10 is shown in FIG. 1 and FIG. 2. FIG. 1 illustrates a cross section of the key button mechanism 10 in a closed or retracted (circuit-open) configuration 200. FIG. 2 illustrates a cross section of the key button mechanism 10 in a rotated or pressed configuration (circuit-closed) 300.

The exemplary device 100, which may be a mobile phone in this case, includes the key button mechanism 10, a housing 20, and a printed circuit board (PCB) 30. In the circuit-open configuration 200, the key button mechanism 10 is accommodated in the housing 20. In the pressed (circuit-closed) configuration 300, the key button mechanism 10 is rotated relative to the housing 20 to actuate the PCB 30.

The housing 20 includes a main body 22 and a sidewall 24, which connects to the main body 22. The housing 20 also includes a passage 242 defined through the side wall 24, and two opposite L-shaped latching member 244 protruding from an inner surface of the side wall 24 and located at two sides of the passage 242 respectively. The latching members 244 are configured to retain the PCB 30 therebetween.

A user can apply manual force in the lateral direction of the device 100 to cause the key button mechanism 10 to rotate in directions indicated by arrows 42, 44 with respect to the housing 20 such that the key button mechanism 10 is angled toward the PCB 30 like shown in FIG. 2, thus causing the PCB 30 to be actuated.

The key button mechanism 10 includes a first key element 12 and a second key element 14, coupled by a retaining structure 16. The first key element 12 in this embodiment is complementary in shape to, but larger than, the passage 242 of the housing 20. The first key element 12 is accommodated in the passage 242. A joint 142 is disposed on a side of the second key element 14 opposite to the first key element 12. The joint 142 may be a hinge, such as a barrel and pin hinge or a resilient member made of material such as rubber or plastic. The joint 142 is configured to pivotably couple the key button mechanism 10 to the main body 22 of the housing 20. The joint 142 is positioned on the main body 22 opposite to the passage 242 so that the key button mechanism 10 can be rotated about the joint 142 relative to the housing 20. The first key element 12 and the second key element 14 both rotate or bend relative to the housing 20 about the joint 142 to angle toward the PCB 30 when the first key element 12 is pushed to the pressed configuration 300.

The retaining structure 16 includes two spaced-apart slots 162 defined through the second key element 14, two retaining members 164 carried on the first key element 12 extending into the slots 162, and a stopping member 166 carried on the first key element 12 resisting the second key element 14. A distal end of each retaining member 164 is wider than the corresponding slot 162 such that the retaining members 164 are unreleasably engaged in the slots 162, and the stopping member 166 resists the opposite side of second key element 14 from the tops of the retaining member 164 thereby cooperatively retaining the second key element 14 to the first key element 12. As the key button mechanism 10 rotates relative to the housing 20, the combination of the retaining members 164, the resisting member 166, and the slots 162 prevent the key button mechanism 10 and the housing 20 from separating. It is understood that one of ordinary skill in the art will appreciate that the retaining members 164, the resisting member 166, and the slots 162 is but one example of a structure for the retaining structure 16 and that other known structures will work. It is also understood that the slots 162 may be defined on either the first key element 12 or the second key element 14 and the slot engaging member (e.g. retaining member and the resisting member) may be carried on the element that the slots 162 are not defined in. It is also understood that the resisting member 166 may be omitted, in which case, the retaining members 164 are directly retained (e.g. hot-melted) in the slots 162 to hold the second key element 14 to the first key element 12.

The PCB 30 has an opening 32 aligned with the passage 242 when the PCB 30 is positioned between the latching members 244 of the housing 20. The opening 32 is configured to make the retaining structure 16 pass through the PCB 30, so that the PCB 30 can be located between the first key element 12 and the second key element 14 when the key button mechanism 10 is carried to the housing 20.

The key button mechanism 10 can further include one or more actuators 144 and an equal amount of key tops 122. If two actuators 144 are used they are respectively located on a side of the second key element 14 facing the first key element 12 and are located at two sides of the joint 142 respectively. The key tops 122 are located on a side of the first key element 12 facing away from the second key element 14 corresponding to the actuators 144. The PCB 30 further includes one or more domes 34, and the amount of the domes 34 is equal to that of the actuators 144. The domes 34 are located on a side of the PCB 30 facing the second key element 14 corresponding to the actuators 144 of the second key element 14. The domes 34 can act as a switching mechanism that can actuate an electronic signal for the electronic device 100 when a key top 122 on the first key element 12 is pressed. The PCB 30 can form a circuitry layer for the key button mechanism 10. When a key top 422 is pressed, the first key element 12 and the second key portion 14 are rotated about the joint 142 relative to the housing 20 and the PCB 30, so that a corresponding actuator 144 of the second key element 14 pushes down the corresponding dome 34 in such a manner that the pushed dome 34 can touch a conductor (not shown) on the PCB 30. Therefore, an electrical circuit on the PCB 30 can be completed and data, corresponding to the pressed key top 122, is entered in the electronic device 100.

The device 100 further includes a biasing member 40 coupled between the key button mechanism 10 and the PCB 30. The biasing member 40 exerts a force on the key button mechanism 10 causing the key button mechanism 10 to rotate about the joint 142 relative to the PCB 30 and the housing 20. The biasing member 40 may be an elastic biasing member (such as an expansion spring, a compression spring, or an elastic band). One biasing member 40 is shown in this embodiment. However it is understood that a plurality of biasing members 40 may be used. In this embodiment, the biasing member 40 is located between the second key element 14 and the PCB 30. In another embodiment, the biasing member 40 may be located between the first key element 12 and the PCB 30. It is understood that the biasing member 40 may be coupled between the key button mechanism 10 and the housing 20.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A key button mechanism for entering data in an electronic device, comprising:
    a first key element; and
    a second key element retained to the first key element by a retaining structure, the second key element having a joint positioned at a side thereof opposite to the first key element and two actuators located at an opposite side thereof facing the first key element, the joint pivotably coupling the second key element to a housing of the electronic device,
    wherein the joint is located at a center of the second key element and the two actuators are located at two opposite ends of the second key element,
    wherein both the first key element and the second key element pivot together about the joint.

2. The key button structure as claimed in claim 1, wherein the actuators are located at two sides of the joint.

3. The key button structure as claimed in claim 1, wherein the retaining structure includes two slots which are defined spacingly through the second key element and two retaining members carried on the first key element respectively retained into the slots.

4. The key button structure as claimed in claim 3, wherein the retaining structure further includes a stopping member carried on the first key element resisting the second key element and a size of a distal end of each retaining member is wider than that of the corresponding slot to unreleasably retain the retaining members in the slots.

5. The key button structure as claimed in claim 1, wherein the joint is a hinge.

6. The key button structure as claimed in claim 1, wherein the joint is a resilient member.

7. The key button structure as claimed in claim 1, wherein the first key element further has two key tops located on a side of the first key element facing away from the second key element corresponding to the actuators.

8. An electronic device, comprising:
    a housing;
    a printed circuit board mounted to the housing; and
    a key button mechanism comprising:
    a first key element; and
    a second key element retained to the first key element by a retaining structure, the second key element having a joint positioned at a side thereof opposite to the first key element and two actuators located at an opposite side thereof facing the first key element, the joint pivotably coupling the second key element to the housing;
    wherein the printed circuit board is located between the first key element and the second key element, the printed circuit board further includes two domes located on a side of the printed circuit board facing the second key element corresponding to the actuators of the second key element,
    wherein the joint is located at a center of the second key element and the two actuators are located at two opposite ends of the second key element,
    wherein both the first key element and the second key element pivot together about the joint.

9. The electronic device as claimed in claim 8, wherein the actuators are located at two sides of the joint.

10. The electronic device as claimed in claim 8, wherein the retaining structure includes two slots which are defined spacedly through the second key element and two retaining members carried on the first key element respectively retained into the slots.

11. The electronic device as claimed in claim 10, wherein the retaining structure further includes a stopping member carried on the first key element resisting the second key element and a size of a distal end of each retaining member is wider than that of the corresponding slot to unreleasably retain the retaining members in the slots.

12. The electronic device as claimed in claim 8, wherein the joint is a hinge.

13. The electronic device as claimed in claim 8, wherein the first key element further has two key tops located on a side of the first key element facing away from the second key element corresponding to the actuators.

14. The electronic device as claimed in claim 8, wherein the housing includes a main body and a side wall which connects with the main body, the housing further includes a passage defined through the main body, the first key element is accommodated in the passage.

15. The electronic device as claimed in claim 14, wherein the housing further includes two opposite latching members protruding from an inner surface of the side wall thereof and located at two sides of the passage respectively, the printed circuit board is retained between the latching members.

16. The electronic device as claimed in claim 15, wherein the printed circuit board has an opening aligned with the passage; the retaining mechanism passing through the opening.

17. The electronic device as claimed in claim 8, wherein the electronic device further includes a biasing member exerting a force on the key button mechanism causing the key button mechanism to rotate about the joint relative to the printed circuit board and the housing.

18. The electronic device as claimed in claim 17, wherein the biasing member is coupled between the key button mechanism and the printed circuit board.

19. An electronic device, comprising:
a housing;
a printed circuit board mounted to the housing, the printed circuit board having two domes spacedly mounted thereon; and
a key button mechanism comprising:
a first key element; and
a second key element retained to the first key element, the second key element having a joint positioned at a side thereof opposite to the first key element, the joint is pivotably coupled the second key element to the housing;
wherein the printed circuit board is located between the first key element and the second key element, the second key element further includes two actuators located on a side thereof facing the printed circuit board, when the first key element is pressed, the first key element and the second key portion are rotated about the joint relative to the housing and the printed circuit board so that an actuator of the second key element pushes down a corresponding dome wherein the joint is located at a center of the second key element and the two actuators are located at two opposite ends of the second key element,
wherein both the first key element and the second key element pivot together about the joint.

* * * * *